United States Patent
Li et al.

(10) Patent No.: US 9,920,241 B2
(45) Date of Patent: Mar. 20, 2018

(54) BREAKERS CONTAINING IRON COMPOUNDS AND THEIR METHODS OF USE

(71) Applicant: Kemira Oyj, Helsinki (FI)

(72) Inventors: Jiang Li, Johns Creek, GA (US);
Roopa Tellakula, Suwanee, GA (US);
Tom Lynch, Roswell, GA (US);
Harsha Kolla, Cumming, GA (US);
Logan Jackson, Norcross, GA (US)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 14/787,908

(22) PCT Filed: May 2, 2014

(86) PCT No.: PCT/US2014/036568
§ 371 (c)(1),
(2) Date: Oct. 29, 2015

(87) PCT Pub. No.: WO2014/179682
PCT Pub. Date: Nov. 6, 2014

(65) Prior Publication Data
US 2016/0075942 A1 Mar. 17, 2016

Related U.S. Application Data

(60) Provisional application No. 61/819,314, filed on May 3, 2013.

(51) Int. Cl.
| | |
|---|---|
| *E21B 43/26* | (2006.01) |
| *C09K 8/88* | (2006.01) |
| *C09K 8/68* | (2006.01) |
| *C09K 8/80* | (2006.01) |
| *E21B 43/267* | (2006.01) |

(52) U.S. Cl.
CPC ............... *C09K 8/882* (2013.01); *C09K 8/68* (2013.01); *C09K 8/80* (2013.01); *E21B 43/26* (2013.01); *E21B 43/267* (2013.01); *C09K 2208/26* (2013.01)

(58) Field of Classification Search
CPC ........ E21B 43/26; E21B 43/267; E21B 43/25; C09K 8/68; C09K 8/685; C09K 2208/26; C09K 8/80
See application file for complete search history.

(56) References Cited

U.S. PATENT DOCUMENTS

| | | |
|---|---|---|
| 7,504,366 B2 | 3/2009 | Hanes, Jr. et al. |
| 2004/0221992 A1 | 11/2004 | Nguyen et al. |
| 2005/0065041 A1* | 3/2005 | Hill .................. C09K 8/74 507/271 |
| 2009/0023613 A1 | 1/2009 | Li et al. |
| 2011/0030953 A1 | 2/2011 | Li et al. |
| 2011/0269904 A1 | 11/2011 | Bismarck et al. |
| 2012/0111567 A1 | 5/2012 | Lin et al. |

OTHER PUBLICATIONS

International Search Report for PCT Patent Application No. PCT/US2014/036568, dated Sep. 5, 2014.

* cited by examiner

*Primary Examiner* — Zakiya W Bates
(74) *Attorney, Agent, or Firm* — King & Spalding

(57) ABSTRACT

Methods and well treatment fluids for fracturing a subterranean formation penetrated by a well bore are provided, the method comprising injecting a well treatment fluid into the well bore at a pressure and flow rate sufficient to fracture the subterranean formation, wherein the well treatment fluid comprises an iron-containing breaker compound. The methods can be used to reduce viscosity of well treatment fluids.

20 Claims, 2 Drawing Sheets

BREAKERS CONTAINING IRON COMPOUNDS AND THEIR METHODS OF USE

CROSS REFERENCE TO RELATED APPLICATIONS

This application is a national stage application under 35 U.S.C. § 371 of International Application No. PCT/US2014/036568, filed on May 2, 2014, which claims priority to U.S. Provisional Patent Application No. 61/819,314, filed on May 3, 2013, each of which are incorporated herein by reference in their entirety.

FIELD OF THE ART

The present disclosure relates to breakers and methods of their use in fracturing applications.

BACKGROUND

Fluids exhibit a measurable property known as viscosity, a term which may be broadly defined as the internal friction or molecular attraction of a given material which manifests itself in resistance to flow. It is measured in liquids by standard test procedures and is usually expressed in poise or centipoise (cP) at a specified temperature, although in oil technology it is sometimes expressed in seconds required for a given volume to flow through a specified orifice at a definite temperature. The viscosity of a fluid is an indication of a number of behavior patterns of the liquid at a given temperature including pumping characteristics, rate of flow, wetting properties, and a tendency or capacity to suspend an insoluble particulate material.

There are a number of industrial operations wherein it is desirable to employ viscous aqueous solutions. For example, viscous aqueous solutions are employed to fracture subterranean formations penetrated by a borehole for increasing the production of petroleum fluids, namely crude oil and natural gas. Viscous aqueous solutions are also employed in the secondary recovery of oil from oil bearing subterranean formations by fluid drive processes.

It is common practice to treat subterranean formations to increase the permeability or conductivity of such formations by procedures that are identified generally as fracturing processes. For example, it is a conventional practice to hydraulically fracture a well bore in order to produce one or more cracks or "fractures" in the surrounding formation by mechanical breakdown of the formation. Fracturing may be carried out in wells that are completed in subterranean formations for virtually any purpose. The usual candidates for fracturing, or other stimulation procedures, are production wells completed in oil and/or gas containing formations. However, disposal wells and injection wells used in secondary or tertiary recovery operations, for example, for the injection of water or gas, may also be fractured in order to facilitate the injection of fluids into such subterranean formations.

Hydraulic fracturing is accomplished by injecting a well treatment fluid into the well bore and applying sufficient pressure on the well treatment fluid to cause the formation to break down with the attendant production of one or more fractures. The well treatment fluid may include a suspended proppant such as sand or other particulate material. The proppant may be deposited in the fractures and functions to hold the fractures open after the pressure is released and the well treatment fluid flows back to the surface. The well treatment fluid must have a sufficiently high viscosity to retain the proppant in suspension or at least to reduce the tendency of the proppant to settle out as it flows along the created fracture. Viscosifiers, such as a polysaccharide or a polyacrylamide, are often used to gel the well treatment fluid to provide the high viscosity needed to retain the proppant in suspension.

After the high viscosity well treatment fluid has been pumped into the well bore and fracturing of the formation and deposition of the proppant has occurred, it is desirable to remove the fluid from the formation to allow hydrocarbon production through the new fractures. Generally, the removal of the highly viscous well treatment fluid is realized by "breaking" the gel, i.e., converting the well treatment fluid into a low viscosity fluid. Breaking the gelled well treatment fluid has commonly been accomplished by adding a "breaker," that is, a viscosity-reducing agent, to the well treatment fluid prior to pumping the well treatment fluid into the subterranean formation.

Acrylamide-containing polymers are often added to well treatment fluids in oilfield applications to reduce friction or to modify rheological properties of the fluid. Such polymers may persist in the fluid or formation for an extended period of time. The polymer residue may plug some of the permeability of the rock, hinder recovery of the water used in the well treatment fluid, or reduce the availability of a source of nitrogen that can support the growth of bacteria in the well. In order to facilitate removal of these polymers after the task has been completed, treatments involving oxidizer-based breakers, for example persulfate salts, may be applied. Breakers can be used in this manner to generate smaller polymeric fragments with more benign environmental profile.

SUMMARY

Disclosed herein is a method for fracturing a subterranean formation penetrated by a well bore, the method comprising the step of injecting a well treatment fluid into the well bore at a pressure and flow rate sufficient to fracture the subterranean formation, wherein the well treatment fluid comprises water, at least one acrylamide-containing polymer, and an iron-containing breaker compound. A method for fracturing a subterranean formation penetrated by a well bore is also provided, the method comprising the steps of (i) injecting a first well treatment fluid comprising at least one acrylamide-containing polymer into the well bore at a pressure and flow rate sufficient to fracture the subterranean formation; and (ii) injecting a second well treatment fluid comprising an iron-containing breaker compound into the well bore.

A well treatment fluid comprising water, an iron-containing breaker compound, and at least one acrylamide-containing polymer, is also disclosed herein.

Methods for reducing the viscosity of a well treatment fluid are also provided, each method comprising adding an iron-containing breaker compound to the well treatment fluid, wherein the well treatment fluid comprises water and at least one acrylamide-containing polymer.

DETAILED DESCRIPTION

Figure 1:
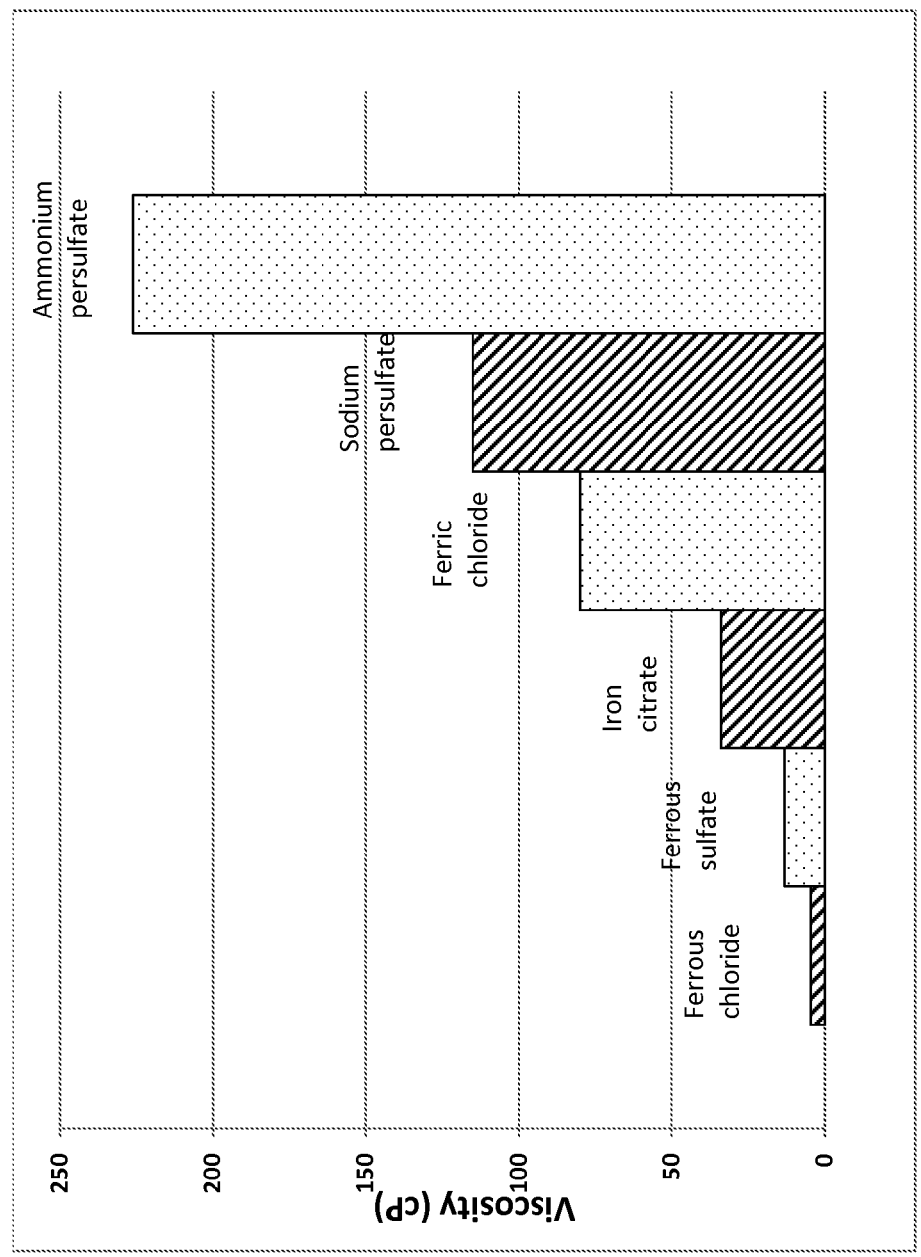
FIG. 1 is a graph of the viscosity (cP) after breaking a well treatment fluid with exemplary and commercially-available breakers.

Disclosed herein are breakers comprising an iron-containing breaker compound, well treatment fluids comprising the iron-containing breakers, and their methods of use. In particular, the exemplary iron-containing breakers may be used to reduce the viscosity of a well treatment fluid as used, for example in methods of fracturing subterranean formations. The exemplary iron-containing breakers can be used in aqueous fluids, including well treatment fluids, to reduce the molecular weight of an acrylamide-based polymer contained in the fluid. The exemplary breakers and methods can be used advantageously to facilitate the breakdown of acrylamide-based polymers into smaller fragments. The processes may be readily incorporated into current processing facilities and may provide economic and environmental benefits.

Breakers

As used herein, the term "breaker" refers to any compound or mixture of compounds which reduces the viscosity of the well treatment fluid. In exemplary embodiments, the breaker comprises an iron-containing compound, i.e., an iron-containing breaker, for example a ferrous compound such as a ferrous salt or a ferric compound such as a ferric salt. The term ferrous is used according to its customary meaning to indicate a divalent iron compound (+2 oxidation state). The term ferric is used according to its customary meaning to indicate a trivalent iron compound (+3 oxidation state).

In exemplary embodiments the ferrous salt comprises an organic anion, an inorganic anion, or a mixture thereof. In exemplary embodiments, the ferrous salt is ferrous citrate, ferrous chloride, ferrous bromide, ferrous fluoride, ferrous sulfate, ammonium iron sulfate and combinations thereof. In exemplary embodiments, the iron-containing breaker comprises ferrous sulfate.

In exemplary embodiments, the ferric salt comprises an organic anion, an inorganic anion, or a mixture thereof. In exemplary embodiments, the ferric salt is ferric citrate, ferric chloride, ferric bromide, ferric fluoride, ferric sulfate, and combinations thereof. In exemplary embodiments, the iron-containing breaker comprises ferric citrate.

In exemplary embodiments, the iron-containing breaker may be used or combined with other breakers known in the art, for example ammonium sulfate, ammonium persulfate, enzymes, copper compounds, ethylene glycol, glycol ethers and combinations thereof. In exemplary embodiments, the breaker comprises ferrous citrate in combination with ammonium persulfate. In exemplary embodiments, the breaker comprises ferrous sulfate in combination with ammonium persulfate.

Acrylamide-Containing Polymers

In exemplary embodiments, the iron-containing breaker may be used to facilitate decomposition of an acrylamide-containing polymer, for example decomposition of an acrylamide-containing polymer into smaller fragments.

As used herein, the terms "polymer," "polymers," "polymeric," and similar terms are used in their ordinary sense as understood by one skilled in the art, and thus may be used herein to refer to or describe a large molecule (or group of such molecules) that contains recurring monomers. Polymers may be formed in various ways, including by polymerizing monomers and/or by chemically modifying one or more recurring monomers of a precursor polymer. A polymer may be a "homopolymer" comprising substantially identical recurring monomers formed by, e.g., polymerizing a particular monomer. A polymer may also be a "copolymer" comprising two or more different recurring monomers formed by, e.g., copolymerizing two or more different monomers, and/or by chemically modifying one or more recurring monomers of a precursor polymer. The term "terpolymer" is used herein to refer to polymers containing three different recurring monomers. Any of the aforementioned polymers may also be linear, branched or crosslinked.

As used herein, the term "acrylamide-containing polymer" includes acrylamide homopolymers, copolymers, and terpolymers including, but not limited to: polyacrylamide; polyacrylamide derivatives; partially hydrolyzed polyacrylamide; partially hydrolyzed polyacrylamide derivatives; methacrylamide homopolymers, copolymers, and terpolymers; diacetone acrylamide polymers; N-methylolacrylamide polymers; friction-reducing acrylamide polymers; and combinations thereof. In exemplary embodiments, the acrylamide-containing polymer further comprises any suitable monomers, for example vinyl acetate, N-vinylformamide, N-vinylacetamide, N-vinylcaprolactam, N-vinylimidazole, N-vinylpyridine, 2-acrylamido-2-methylpropanesulfonic acid (AMPS), N-vinylpyrolidone, acrylamidopropyltrimonium chloride, or combinations thereof.

In exemplary embodiments, the acrylamide-containing polymer is a copolymer. In exemplary embodiments, the acrylamide-containing copolymer contains about 1 to about 99, about 5 to about 95, about 10 to about 90, about 20 to about 80, about 30 to about 70, about 40 to about 60 weight percent of acrylamide, methyacrylamide or acrylamide derivatives.

In exemplary embodiments, the acrylamide-containing polymer may have any suitable molecular weight. In exemplary embodiments, the acrylamide-containing polymer has a molecular weight of about 1,000,000 to about 30,000,000 Daltons.

Well Treatment Fluids

As used herein, the terms "well treatment fluid," "pressurized fluid" or "fracturing fluid" refer to a fluid composition that is useful in oil field applications including, but not limited to, low-volume or high-volume hydraulic fracturing, slick water fracturing and well stimulation for oil, gas or geothermal energy wells, as well as cleanup related thereto. In exemplary embodiments, the well treatment fluid can be an aqueous fluid, gel, foam. In exemplary embodiments, the well treatment fluid is slickwater-based. In exemplary embodiments, the well treatment fluid has sufficient viscosity to facilitate fracturing of a formation. In exemplary embodiments, the well treatment fluid has sufficient viscosity to facilitate suspension of proppants.

In exemplary embodiments, a well treatment fluid comprises an iron-containing breaker compound. In exemplary embodiments, the well treatment fluid comprises water, an iron-containing breaker compound, and at least one acrylamide-containing polymer. In exemplary embodiments, the well treatment fluid comprising the iron-containing breaker compound is used in a hydraulic fracturing application before, with or after other well treatment fluids. Other well treatment fluids include, for example, a well treatment fluid that comprises water and at least one acrylamide-containing polymer.

In exemplary embodiments, the well treatment fluid comprises water. In exemplary embodiments, the well treatment fluid includes fresh water, brine, aqueous-based foams, water-alcohol mixtures, and/or combinations thereof.

In exemplary embodiments, the well treatment fluid comprises at least one acrylamide-containing polymer in an amount of about 0.005% to about 5%, 0.01% to about 1%, 0.05% to about 0.5%, or about 0.075% to about 0.25% by volume of the well treatment fluid.

In exemplary embodiments, the well treatment fluid comprises one or more friction reducers. In exemplary embodiments, the well treatment fluid comprises a friction reducer or friction-reducing polymer composition that comprises an acrylamide-containing polymer. As used herein, the term "friction reducer" or "friction-reducing polymer" is a material which reduces the friction between the well treatment fluid and the means for conducting the fluid into the well bore. In particular embodiments, a friction reducer allows pumps to pump at a higher rate without having greater pressure on the surface. In exemplary embodiments, the acrylamide-containing polymer is selected from polyacrylamide, polyacrylamide derivatives, and combinations thereof. In exemplary embodiments, the friction-reducing polymer composition comprises an acrylamide-containing polymer and one or more additional polymers selected from the group consisting of polyacrylic acids, polyacrylic salts, acrylate copolymers containing acrylamide, acrylonitrile and combinations thereof. Other suitable polymers will be apparent to those of skill in the art and are to be considered within the scope of the present invention.

In exemplary embodiments, the polymer in the friction-reducing polymer composition can be in the form of dry powder or carried (suspended) in liquid such as petroleum distillate or mineral oil.

In exemplary embodiments, the well treatment fluid comprises one or more viscosifier compositions. In exemplary embodiments, at least one of the viscosifier compositions comprises an acrylamide-containing polymer. As used herein, the term "viscosifier" refers to a material which increases the viscosity of the well treatment fluid. In exemplary embodiments, the viscosifier composition is a thickening polymer such as a hydratable polymer such as, for example, one or more polymers capable of forming linear or crosslinked gels.

In exemplary embodiments, one or more of the viscosifier compositions comprises an acrylamide-containing polymer. In exemplary embodiments, at least one of the viscosifier compositions comprises a hydratable polymer, for example galactomannan gums, guars, derivatized guars, cellulose and cellulose derivatives, starch, starch derivatives, xanthan, derivatized xanthan and mixtures thereof. In exemplary embodiments, the viscosifier composition comprises a hydratable polymer selected form the group consisting of guar gum, guar gum derivative, locust bean gum, welan gum, karaya gum, xanthan gum, scleroglucan, diutan, cellulose, cellulose derivatives and combinations thereof. In exemplary embodiments, the viscosifier composition comprises a hydratable polymer selected form the group consisting of hydroxypropyl guar (HPG), carboxymethyl hydroxypropyl guar (CMHPG), hydroxyethyl cellulose (HEC), carboxymethyl hydroxyethyl cellulose (CMHEC), carboxymethyl cellulose (CMC), dialkyl carboxymethyl cellulose, and combinations thereof. In exemplary embodiments, the viscosifier composition is selected from the group consisting of phosphomannans, scerolglucans, dextrans and combinations thereof.

In exemplary embodiments, the well treatment fluid comprises a crosslinking agent. In exemplary embodiments, any crosslinking agent suitable for crosslinking the hydratable polymer may be employed. In exemplary embodiments, suitable crosslinking agents can be any conventionally used crosslinking agents which are known to those skilled in the art. In exemplary embodiments, suitable crosslinking agents include borate crosslinkers. In exemplary embodiments, suitable crosslinking agents include metal ions such as aluminum, antimony, zirconium and titanium-containing compounds, including organotitanates.

In exemplary embodiments, a well treatment composition comprises a viscosifier composition having a guar or derivatized guar, and a crosslinking agent. In exemplary embodiments, suitable crosslinkers for guar based polymers include borate ion donating materials. In exemplary embodiments, borate-based crosslinkers include, but are not limited to, organo-borates, mono-borates, poly-borates, mineral borates, and combinations thereof.

In exemplary embodiments, the polymer in the viscosifier composition can be in the form of dry powder, carried (suspended) in liquid or dissolved in a liquid.

In exemplary embodiments, the well treatment composition comprises one or more breaker compositions. In exemplary embodiments, at least one of the breaker compositions comprises an iron-containing breaker, such as the exemplary iron-containing breakers described herein. In exemplary embodiments, the well treatment composition may comprise one or more breakers known in the art, for example ammonium sulfate, ammonium persulfate, enzymes, copper compounds, ethylene glycol, glycol ethers and combinations thereof. In exemplary embodiments, the breaker comprises ferrous citrate in combination with ammonium persulfate. In exemplary embodiments, the breaker comprises ferrous sulfate in combination with ammonium persulfate.

In exemplary embodiments, the well treatment fluid may comprise one or more additives, such as additives that are used in the oil industry and known in the art. In exemplary embodiments, the well treatment fluid may further comprise other viscosifiers, other friction reducers, borate salts, proppants, acids, sodium chloride, emulsifiers, sodium and potassium carbonates, biocides, anti-scaling compounds, corrosion preventing compounds, or other suitable additives. In exemplary embodiments, the well treatment fluid may further comprise acids, hydrochloric acid, acetic acid, sodium chloride, ethylene glycol, scale reducers, sodium carbonate, potassium carbonate, crosslinking agents, borate salts, corrosion inhibitors, citric acid, non-emulsifiers, emulsifiers, iron control agents, delay additives, silt suspenders, flowback additives, isopropanol, methanol, and combinations thereof.

In exemplary embodiments, the iron-containing breaker may be provided in any amount sufficient to provide a necessary or desired result, i.e., reduction in viscosity of the well treatment fluid. In exemplary embodiments, the amount of the iron-containing breaker in the well treatment fluid is about 0.001% to about 0.1%, or about 0.005% to about 0.05%, or about 0.075% to about 0.02% of the well treatment fluid volume.

In exemplary embodiments, the iron-containing breaker can be in the form of dry powder, carried (suspended) in liquid or dissolved in a liquid.

Methods

In exemplary embodiments, methods for fracturing a subterranean formation penetrated by a well bore comprise injecting a well treatment fluid into the well bore at a pressure and flow rate sufficient to fracture the subterranean formation, wherein the well treatment fluid comprises water, at least one acrylamide-containing polymer, and an iron-containing breaker compound. In exemplary embodiments, the well treatment fluid is a hydraulic fracturing fluid.

In exemplary embodiments, methods for fracturing a subterranean formation penetrated by a well bore comprise the steps of (i) injecting a first well treatment fluid comprising at least one acrylamide-containing polymer into the well bore at a pressure and flow rate sufficient to fracture the subterranean formation; and (ii) injecting a second well treatment fluid comprising an iron-containing breaker compound into the well bore. In exemplary embodiments, the first well treatment fluid further comprises a proppant. In exemplary embodiments, the second well treatment fluid further comprises a proppant.

In exemplary embodiments, methods for reducing the viscosity of a well treatment fluid comprise adding an iron-containing breaker compound to a well treatment fluid, wherein the well treatment fluid comprises water and at least one acrylamide-containing polymer.

In exemplary embodiments, methods for enhancing the biodegradation of a well treatment fluid comprise adding an iron-containing breaker compound to a well treatment fluid, wherein the well treatment fluid comprises water and at least one acrylamide-containing polymer.

In exemplary methods, the well treatment fluids may include any of the exemplary well treatment fluids described herein or components thereof. For example, the well treatment fluids may contain one or more of: friction reducers, viscosifiers, cross-linkers, proppants, breakers, and other additives. Suitable combinations of well treatment fluids and/or components thereof will be apparent to those of skill in the art, in view of the teachings herein.

In exemplary methods, the components of the well treatment fluids may be pre-mixed, or combined or mixed simultaneously, or in a sequential order, or a combination thereof to provide a necessary or desired composition or effect. The addition or injection of the components may be determined, at least in part, by the fluid transport system of a particular operation, for example, the location of inlet port(s) along a fluid transport line. Suitable variations in the methods of adding or mixing or combining the well treatment fluids and/or components thereof will be apparent to those of skill in the art, in view of the teachings herein.

In exemplary embodiments, the well treatment fluid comprising the acrylamide-containing polymer is injected into the well bore prior to the injection of an iron-containing breaker into the well bore, i.e., in a breaker-free stage; or it is injected into the well bore along with the iron-containing breaker, i.e., a breaker-laden stage. In exemplary embodiments, when the acrylamide-containing polymer is injected at the same time as the iron-containing breaker, i.e., is present in the same stage as the iron-containing breaker, the iron-containing breaker exhibits some affinity towards the acrylamide-containing polymer.

In exemplary embodiments, the iron-containing breaker reduces the molecular weight of at least one acrylamide-containing polymer in the well treatment composition. In exemplary embodiments, the iron-containing breaker generates fragments of the at least one acrylamide-containing polymer, for example biodegradable or oligomeric fragments. In exemplary embodiments, the addition of the iron-containing breaker results in decreasing the viscosity of the well treatment fluid.

In exemplary embodiments, the iron-containing breaker reduces the molecular weight of an acrylamide-containing polymer and/or reduces the viscosity of the well treatment fluid over a period of time, for example, up to about 48 hours. In exemplary embodiments, the iron-containing breaker reduces the viscosity of the well treatment fluid within about 5 minutes to about 48 hours, from about 15 minutes to about 10 hours, from about 30 minutes to about 8 hours, from about 1 hour to about 6 hours, from about 1.5 hours to about 5 hours, or from about 2 hours to about 4 hours. In particular embodiments, the time period is about 15 minutes, about 30 minutes, about 1 hour, about 1.5 hours, about 2 hours, about 4 hours, about 5, about 6 hours, about 8 hours, about 10 hours, about 12 hours, about 18 hours, about 24 hours, about 30 hours, about 36 hours, about 42 hours, or about 48 hours from the time well treatment fluid comprising the iron-containing breaker is injected into the well bore to the time the viscosity is reduced.

In exemplary embodiments, the iron-containing breaker generates oligomeric fragments of the acrylamide-containing polymer. In exemplary embodiments, the fragments of the acrylamide-containing polymer generated by the iron-containing breaker are biodegradable. The fragments are not particularly limited, however, in exemplary embodiments, the iron-containing breaker generates fragments of the acrylamide-containing polymer having a molecular weight of less than about 600,000, about 550,000, about 500,000, about 450,000, about 400,000, about 300,000, or about 200,000 Daltons.

In exemplary embodiments, the decrease in the viscosity of the well treatment fluid allows for easier recovery of the well treatment fluid. In exemplary embodiments, the viscosity of the well treatment fluid with the iron-containing breaker is less than the viscosity of well treatment fluid without the breaker. In exemplary embodiments, the exemplary iron-containing breaker reduces the viscosity of the well treatment fluid faster than conventional breakers. In exemplary embodiments, the exemplary iron-containing breaker reduces the viscosity of the well treatment fluid faster than ammonium persulfate. In exemplary embodiments, the iron-containing breaker acting on the well treatment fluid increases the fracture conductivity within the formation.

In exemplary embodiments, the iron-containing breaker reduces the viscosity of the well treatment fluid to less than about 10 cP at a shear rate of 10 s−1, about 5 cP at a shear rate of 10 s−1, about 2 cP at a shear rate of 10 s−1, about 20 cP at a shear rate of 100 s−1, about 10 cP at a shear rate of 100 s−1, or about 3 cP at a shear rate of 100 s−1.

Suitable adjustments to the ratios of the components that will affect the conditions in which the viscosity of the well treatment fluid is reduced, or in which the acrylamide-containing polymer breaks down, will be apparent to those of skill in the art, in view of the teachings herein.

In exemplary embodiments, the iron-containing breaker initiates breaking at ambient temperatures. In exemplary embodiments, the iron-containing breaker initiates breaking under heating. In exemplary embodiments, temperatures that initiate breaking are in the range from 75° F. to about 300° F., from about 100° F. to about 200° F., from about 120° F. to about 180° F., or about 150° F.

In the exemplary embodiments, the well treatment fluid may be handled or processed in any manner as necessary or desired. In exemplary embodiments, the well treatment fluid should be handled in compliance with governmental regulations. In exemplary embodiments, the well treatment fluid may be disposed of, processed for environmental remediation, or recycled. In the exemplary embodiments, the iron containing breaker may be used in the disposal, environmental remediation or recycling of the well treatment fluid. In the exemplary embodiments, recycled well treatment fluid may be used at any point where well treatment fluid is used.

EXAMPLES

Example 1

In this example, reduction in the viscosity of a well treatment fluid is examined by treatment with exemplary (iron-containing) and commercially available (comparative) breaker systems. Breaker formulations are provided in Table 1. All formulations include 0.4% partially hydrolyzed polyacrylamide by weight.

Figure 2:
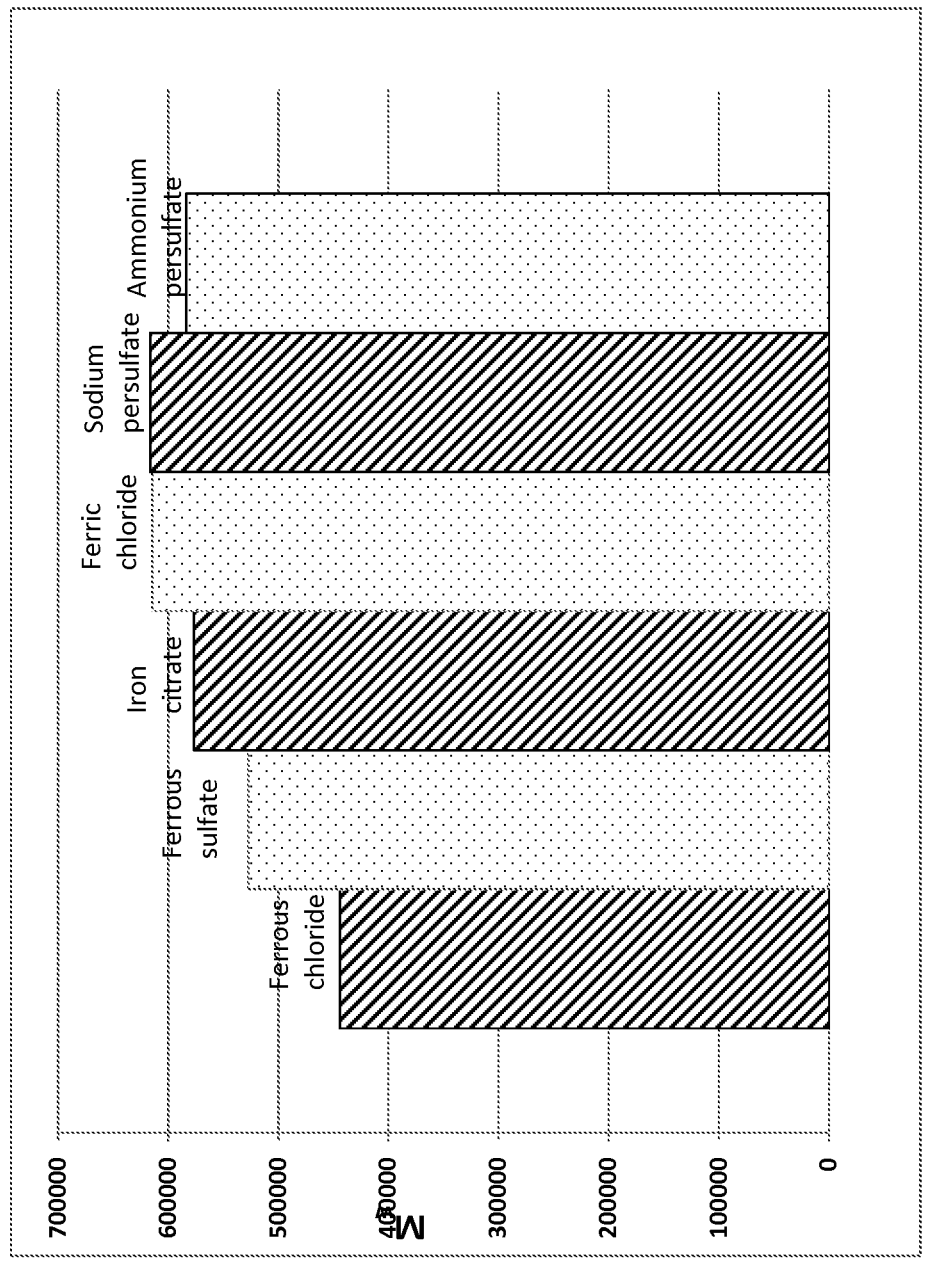
FIG. 2 is a graph showing the molecular weight of polymer fragments generated after breaking a well treatment fluid with exemplary and commercially-available breakers.

The breaker formulations were prepared by dissolving the breaker in water to form a 1% solution, and then mixing the solution with the 0.4% partially hydrolyzed polyacrylamide solution to provide a specified amount of breaker, as shown in Table 1. Each formulation was heated at 150° F. for about 3 hours. The samples were subsequently cooled to ambient temperature before the viscosity measurement. The viscosity of the samples were measured in a Brookfield Viscometer at 12 rpm and at 72° F. The samples were then analyzed for molecular weight. The weight average molecular weight (Mw) was determined by Gel Permeation Chromatography (GPC). All samples were diluted to about 0.25% solids, with 0.1M $NaNO_3$ eluent, tumbled to mix and filtered through a 0.22 µm filter. The resulting solutions were injected directly into the GPC. The sample chromatograms were processed relative to a polyacrylamide standard calibration curve (MW ranging from 8980 to 990,000 Dalton). The results are shown in Table 1 and in FIGS. 1 and 2.

| Formulation | Breaker | Breaker (%) | Viscosity (cP) | $M_w$ (Da) |
|---|---|---|---|---|
| Comparative 1 | Ammonium persulfate | 0.04 | 226 | 583688 |
| Comparative 2 | Sodium persulfate | 0.04 | 115 | 616358 |
| Exemplary 1 | Ferrous sulfate heptahydrate | 0.04 | 13 | 527252 |
| Exemplary 2 | Ferrous chloride | 0.04 | 4.6 | 443919 |
| Exemplary 3 | Ferric chloride | 0.04 | 80 | 614451 |
| Exemplary 4 | Ferric citrate | 0.04 | 34 | 576607 |
| Reference | (none) | (none) | 2090 | n/a |

We claim:

1. A method for fracturing a subterranean formation penetrated by a well bore, the method comprising the step of injecting a well treatment fluid into the well bore at a pressure and flow rate sufficient to fracture the subterranean formation, wherein the well treatment fluid comprises water, at least one acrylamide-containing polymer, and an iron-containing breaker compound; wherein the viscosity of the well treatment fluid with the iron-containing breaker is less than the viscosity of the well treatment fluid without the iron-containing breaker; and
wherein the amount of the iron-containing breaker in the well treatment fluid is about 0.005% to about 0.05% of the well treatment fluid volume, and the well treatment fluid comprises at least one acrylamide-containing polymer in an amount of about 0.005% to about 5%.

2. The method of claim 1, wherein the iron-containing breaker compound is a ferrous salt.

3. The method of claim 1, wherein the iron-containing breaker compound is selected from the group consisting of ferrous chloride, ferrous bromide, ferrous fluoride, ferrous sulfate, ammonium iron sulfate and combinations thereof.

4. The method of claim 1, wherein the iron-containing breaker compound is ferrous chloride.

5. The method of claim 1, wherein the iron-containing breaker compound is ferrous sulfate.

6. The method of claim 1, wherein the at least one acrylamide-containing polymer is selected from the group consisting of: acrylamide homopolymers, copolymers, and terpolymers; polyacrylamide; polyacrylamide derivatives; methacrylamide homopolymers, copolymers, and terpolymers; diacetone acrylamide polymers; N-methylolacrylamide polymers; and combinations thereof.

7. The method of claim 1, wherein the well treatment fluid further comprises one or more additional breakers.

8. The method of claim 7, wherein the one or more additional breakers are selected from the group consisting of ammonium sulfate, ammonium persulfate, sodium persulfate, enzymes, copper compounds, ethylene glycol, glycol ethers and combinations thereof.

9. A method for fracturing a subterranean formation penetrated by a well bore, the method comprising the steps of (i) injecting a first well treatment fluid comprising at least one acrylamide-containing polymer into the well bore at a pressure and flow rate sufficient to fracture the subterranean formation; and (ii) injecting a second well treatment fluid comprising an iron-containing breaker compound into the well bore; wherein the viscosity of the well treatment fluid with the iron-containing breaker is less than the viscosity of the well treatment fluid without the iron-containing breaker; and
wherein the amount of the iron-containing breaker in the well treatment fluid in the well bore is about 0.005% to about 0.05% of the well treatment fluid volume, and the well treatment fluid in the well bore comprises at least one acrylamide-containing polymer in an amount of about 0.005% to about 5%.

10. The method of claim 9, wherein the first well treatment fluid further comprises a proppant.

11. The method of claim 9, wherein the second well treatment fluid further comprises a proppant.

12. The method of claim 9, wherein the iron-containing breaker compound is a ferrous salt.

13. The method of claim 9, wherein the iron-containing breaker compound is selected from the group consisting of ferrous chloride, ferrous bromide, ferrous fluoride, ferrous sulfate, ammonium iron sulfate and combinations thereof.

14. The method of claim 9, wherein the iron-containing breaker compound is ferrous chloride.

15. The method of claim 9, wherein the iron-containing breaker compound is ferrous sulfate.

16. The method of claim 9, wherein the at least one acrylamide-containing polymer is selected from the group consisting of: acrylamide homopolymers, copolymers, and terpolymers; polyacrylamide; polyacrylamide derivatives; methacrylamide homopolymers, copolymers, and terpolymers; diacetone acrylamide polymers; N-methylolacrylamide polymers; and combinations thereof.

17. The method of claim 9, wherein the first or the second well treatment fluid further comprises one or more additional breakers.

18. The method of claim 17, wherein the one or more additional breakers are selected from the group consisting of ammonium sulfate, ammonium persulfate, sodium persulfate, enzymes, copper compounds, ethylene glycol, glycol ethers and combinations thereof.

19. A well treatment fluid comprising water, an iron-containing breaker compound, and at least one acrylamide-containing polymer; wherein the viscosity of the well treatment fluid with the iron-containing breaker is less than the viscosity of the well treatment fluid without the iron-containing breaker; and wherein the amount of the iron-containing breaker in the well treatment fluid is about 0.005% to about 0.05% of the well treatment fluid volume, and the well treatment fluid comprises at least one acrylamide-containing polymer in an amount of about 0.005% to about 5%.

20. A method for reducing the viscosity of a well treatment fluid, the method comprising adding an iron-containing breaker compound to the well treatment fluid, wherein the well treatment fluid comprises water and at least one acrylamide-containing polymer; wherein the viscosity of the well treatment fluid with the iron-containing breaker is less than the viscosity of the well treatment fluid without the iron-containing breaker; and wherein the amount of the iron-containing breaker in the well treatment fluid is about 0.005% to about 0.05% of the well treatment fluid volume, and the well treatment fluid comprises at least one acrylamide-containing polymer in an amount of about 0.005% to about 5%.

* * * * *